United States Patent

[11] 3,609,534

[72] Inventor Albert Efimovich Gurevich
Novosivkovskaya ulitsa, 1a, kv. 13, Leningrad, U.S.S.R.
[21] Appl. No. 822,631
[22] Filed May 7, 1969
[45] Patented Sept. 28, 1971

[54] DEVICE UTILIZING DC TRANSFORMERS FOR SELECTIVE LOCATION OF EARTH CONNECTION WITHIN BUS SYSTEM
2 Claims, 1 Drawing Fig.

[52] U.S. Cl. .................................. 324/52, 317/26
[51] Int. Cl. .................................. G01r 31/02, G01r 31/08
[50] Field of Search .......................... 324/51, 52, 54; 317/26, 27; 340/255

[56] References Cited
UNITED STATES PATENTS
2,246,310 6/1941 Lenehan ...................... 317/26
2,548,625 4/1951 Seeley ......................... 317/26

OTHER REFERENCES
Stubbings, G. W., Automatic Protection of AC Circuits: 4th Edition, 1954, Chapman & Hall Ltd. London pp. 195–200

*Primary Examiner*—Gerard R. Strecker
*Attorney*—Waters, Roditi & Schwartz

ABSTRACT: A device for selective location of an earth connection within a bus system adapted to interconnect the converter units and the external earthing of a converting substation employed in a H.T. direct-current electric transmission line, comprising DC transformers inserted both into each circuit adapted to connect the converter units of the like polarities to the bus system and into each earthing system; the secondary currents supplied from said transformers are fed to the differentiator through two summator and two rectifiers, one of the summators being adapted to effect subtraction of absolute magnitudes of the secondary currents characterizing the condition of the converter circuits of the unlike polarity, whereas the other summator is adapted to effect summing up of the absolute magnitudes of the secondary currents, characterized in that the condition of the earthing circuits. The signal produced by the differentiator is the evidence of the occurrence of an earth connection.

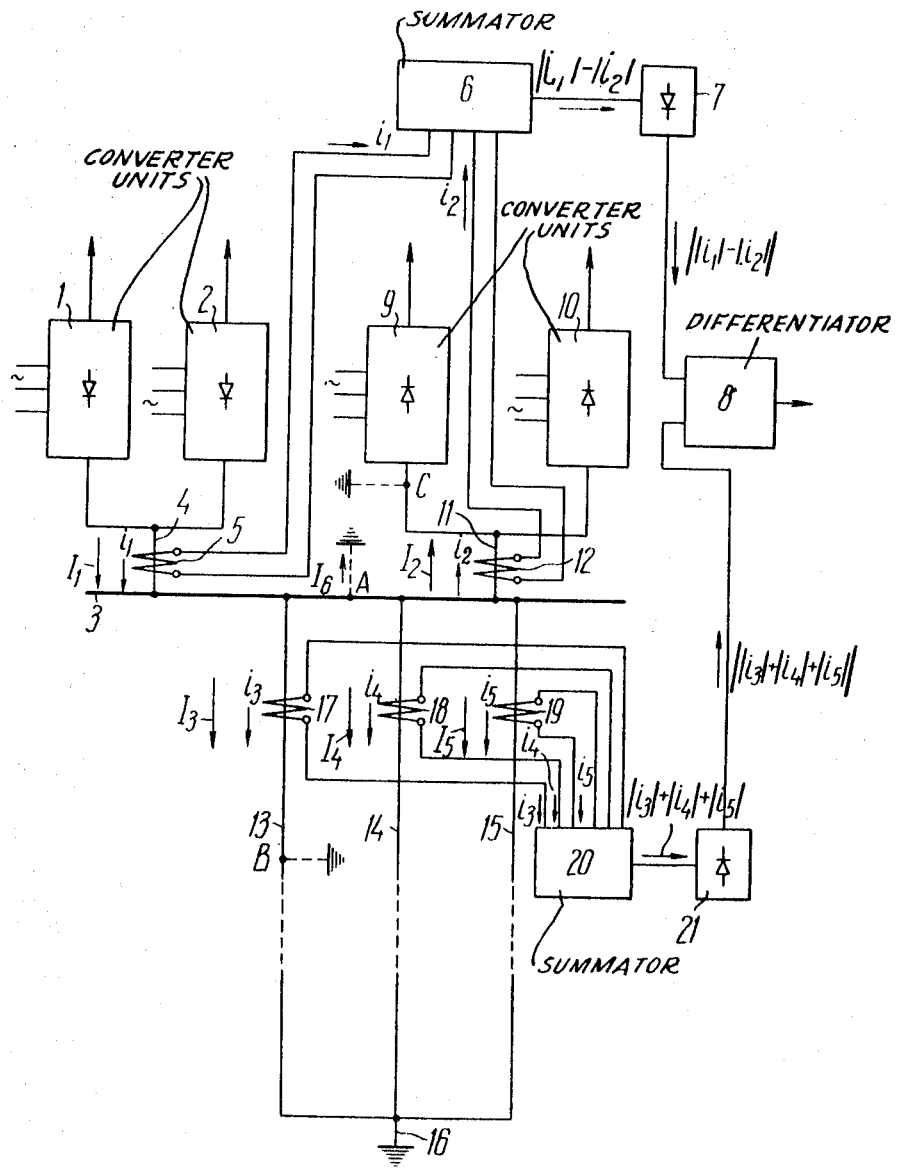

DEVICE UTILIZING DC TRANSFORMERS FOR SELECTIVE LOCATION OF EARTH CONNECTION WITHIN BUS SYSTEM

The present invention relates generally to H.T. direct-current electric transmission lines and more particularly to devices for selective location of earth connection within a bus system adapted to interconnect converter units and the external earthing of a converting substation.

Known in the present state of the art are devices for selective location of earth connection within a bus system which features a converter unit and a circuit adapted to interconnect said bus system and the external earthing of the converting substation. The hereinabovementioned device is provided with a differentiator which is fed with secondary currents supplied from DC transformers inserted both in the circuit of the converter unit and in the circuit adapted to interconnect the bus system and the external earthing.

In case of the occurrence of an earth connection within the bus system in question a signal appears at the differentiator output that is utilized in the signalling regulator and control systems.

However, with two or more converter units as well as with the unlike polarity of the units involved there is no possibility to locate an earth connection by virtue of the heretoforeknown devices.

The main object of the present invention is to provide a device for selective location of earth connection within a bus system adapted to interconnect converter units and the external earthing of the converting substation of a H.T. direct-current electric transmission line, that would be capable of taking the account of the number and polarity of the converter units.

Said object is accomplished by the fact that in the device featuring DC transformers inserted both into the circuits adapted to connect the converter units to the bus system and into the earthing circuit adapted to connect the bus system to the external earthing, according to the invention, the DC transformers are inserted both into each circuit adapted to connect combined leadouts of the like-polarity converter units and the bus system and into each earthing circuit. The secondary currents from the transformers inserted into the earthing circuits are fed to the differentiator through a summator and rectifier, whereas the secondary currents from other transformers are fed to the differentiator through another summator and rectifier, the first summator being adapted to effect summing while the second summator is adapted to effect subtraction of absolute magnitudes of the values supplied to their current inputs.

The employment of rectifiers placed before the differentiator is due to the following.

The difference sign of the values of the secondary currents supplied from the units with different polarities depends upon the relationship between the aforementioned values. Moreover, the phase of secondary alternating currents supplied from the DC transformers does not depend upon the direction of primary direct currents supplied from said transformers. Therefore the change in the direction of the currents flowing through the earthing circuits does not result in the change of the direction of secondary alternating currents supplied from DC transformers. For the above-mentioned reasons to detect an earth connection within the bus system it is required to effect calculations based on the absolute magnitudes of the currents under consideration.

A substantial advantage of the present invention lies in the fact that it provides effective protection of the apparatus or equipment connected with the bus system against damage which is the case where relatively high currents pass through a breakdown insulation. Moreover, the present invention provides the possibility to preclude voltages dangerous to personnel that occur within the breakdown insulation.

The invention will be described below by way of illustration of a preferred embodiment thereof with due reference to the sole figure of the accompanying drawing which represents the diagram of the above-mentioned embodiment.

The device incorporates the units 1 and 2 of the converters featuring the like polarity that are connected to a bus system 3 through a circuit 4. The circuits 4 feature a DC transformer 5. The secondary current supplied from said transformer is fed to a summator 6 switched into a differentiator 8 through a rectifier 7. Analogously to that described hereinabove, the units 9 and 10 of the converters featuring unlike polarity are connected to the same bus system 3 through a circuit 11 comprising a DC transformer 12. The secondary current delivered from said transformer is fed to the same summator 6.

The summator 6 is adapted to effect subtraction of absolute magnitudes of the values of said secondary currents supplied from the transformers 5 and 12 which are provided in the circuits of the converters featuring unlike polarity. The output current from the summator 6 is rectified in the rectifier 7 and is applied to the input of the differentiator 8. Connected to the bus system 3 are earthing circuits 13, 14 and 15 which are in turn connected to an external ground 16. Moreover, connected to the aforementioned bus system is an auxiliary equipment (not shown in the drawing) such as voltage dividers, discharger arresters, earthing switches etc.

The earthing circuits feature transformers 17, 18, 19 whose secondary currents are applied to a summator 20 where summing up of the absolute magnitudes of said currents takes place, and further through a rectifier 21 said currents are applied to the differentiator 8.

The differentiator 8 is adapted to effect subtraction of absolute magnitudes of the signals supplied from the rectifiers 7 and 21. The relationship between said signals determines the value and polarity of the signal available at the differentiator output.

When there is no earth connection, the value of the difference between the total primary current $I_1$ supplied from the units 1 and 2 of the converters of the like polarity and the total primary current $I_2$ supplied from the units 9 and 10 of the converters featuring the other polarity with said both currents flowing through the circuits 4 and 11 respectively, equals the value of the sum of the primary currents $I_3$, $I_4$, $I_5$, flowing through the earthing circuits 13, 14 and 15, respectively. Due to the above-said the difference between the absolute magnitudes of the secondary currents $i_1$ and $i_2$ supplied from the transformers 5 and 12 respectively, equals the sum of the absolute magnitudes of the secondary currents $i_3$, $i_4$ and $i_5$ supplied from the transformers 13, 14 and 15 respectively; in this case there is no signal at the output of the differentiator 8.

In case of any earth connection, say at the point A, (shown in the drawing by the broken line) the current $I_1$ and $I_2$ supplied from the units 1, 2, 9 and 10 do not practically change within the section of the bus system confined by the places of installation of the transformers 5, 12, 13, 14 and 15, whereas the circuits 13, 14 and 15 through which the currents $I_3$, $I_4$ and $I_5$ flow, are deenergized due to the fact that said circuits are shunted through the earth connection, provided that transient resistance at the point of the earth connection is neglected. In this case the current $I_6$ which is practically equal to the difference between the currents $I_1$ and $I_2$ passes through the earth connection. Under these conditions the current absolute value of the current $I_1-I_2$ is applied to the differentiator 8 on the side of the rectifier 7, while on the side of the rectifier 21 there is practically no current. Due to this, at a signal rectifier 21 there is practically no current. Due to this, a signal appears at the differentiator output which is an evidence of an earth connection within the bus system.

If the earth connection occurs at the point B, i.e. beyond the section under consideration redistributions of the currents $I_3$, $I_4$, $I_5$ between the circuits 13, 14, 15 occurs without the change of the sum of the aforementioned currents. In this case the sum of the absolute magnitudes of the secondary currents $i_3$, $i_4$, $i_5$ supplied from the transformers 17, 18, 19 respectively remains equal to the difference between the secondary currents $i_1$ and $i_2$ supplied from the transformers 5 and 12, respectively. No signal appears at the differentiator output.

If an earth connection occurs at the point C which is likewise beyond the section under consideration, the total current $I_1$ from the converter units 1 and 2 will inflow to the point C through the transformers 5 and 12, while the circuits 17, 18, 19 will be deenergized. At both differentiator inputs the currents will be equal zero since in this case $$||i_1|-|i_2||=||i_1|-|i_1||=0$$
$$||i_3|+|i_4|+|i_5||=0$$

As is known the curves of the secondary currents from DC transformers are of trapezoidal shape therefore it is necessary that if each of the circuits 4, 11, 13, 14, 15 is provided with a single transformer, the AC auxiliary voltage of the DC transformers 5, 12, 17, 18, 19 feature an identical phase. This condition being observed and the characteristics of these transformers being identical, in case the secondary current $i_1$ to $i_5$ are in phase, rectification of each of the currents in the summators 6 and 20 is not obligatory. If the currents $i_3$ to $i_5$ are not in phase and each of them is rectified in the summator 20, the rectifier 21 is not obligatory.

It is possible on the basis of the device according to the present invention to provide protection devices whose operation will result in the case of transient and removable earth connections in elimination of breakdowns without disconnecting the converter units, i.e. without interruption of power supply through a DC electric transmission line, and in the case of stable faults operation of the aforementioned devices make it possible to quickly locate and eliminate the cause of the breakdown involved.

It is clear that the device according to the present invention may find its application in substations equipped with converter units of the like polarity with the employment of a plurality of earthing circuits. In this case the DC transformer inserted into the net connection circuit of the converter units, is directly connected to the differentiator. The connection diagram of the transformers inserted into the earthing circuits employing the differentiator remains unchanged.

I claim:

1. A device for selective location of an earth connection within a bus system adapted to interconnect converter units of like polarity and converter units of unlike polarity to the external earthing of a converting substation employed in a H.T. direct-current electric transmission line, said bus system comprising: a plurality of earthing circuits connecting the bus system and the external earthing, further circuits connecting both converter units to the bus system, DC transformers inserted in each circuit connecting the converter units to said bus system and DC transformers inserted in each earthing circuit connecting said bus system to said external earthing, said device comprising: a first summator connected to the secondaries of the DC transformers in said circuits connecting said converter units to said bus system, said first summator being adapted to effect subtraction of the absolute magnitudes of the currents being fed thereto from the DC transformers; a second summator connected to the secondaries of said DC transformers in said earthing circuits, said second summator being adapted to effect summation of the absolute magnitudes of the currents being fed thereto; and a differentiator connector to said summators for producing a signal to indicate a ground connection in the bus system.

2. A device as claimed in claim 1 comprising a rectifier connected between each summator and said differentiator.